US010691191B2

(12) United States Patent
Sundaramurthy et al.

(10) Patent No.: US 10,691,191 B2
(45) Date of Patent: *Jun. 23, 2020

(54) APPLICATION DISPLAY ON A LOCKED DEVICE

(71) Applicant: MICROSOFT TECHNOLOGY LICENSING, LLC, Redmond, WA (US)

(72) Inventors: Palani Sundaramurthy, Kirkland, WA (US); Igor B. Peev, Seattle, WA (US); Robert Charles Johnstone Pengelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/683,894

(22) Filed: Aug. 23, 2017

(65) Prior Publication Data

US 2017/0351337 A1    Dec. 7, 2017

Related U.S. Application Data

(63) Continuation of application No. 13/873,011, filed on Apr. 29, 2013, now Pat. No. 9,760,176, which is a
(Continued)

(51) Int. Cl.
*G06F 1/3203* (2019.01)
*G06F 3/0481* (2013.01)
(Continued)

(52) U.S. Cl.
CPC ............ *G06F 1/3203* (2013.01); *G06F 3/017* (2013.01); *G06F 3/0481* (2013.01);
(Continued)

(58) Field of Classification Search
CPC .... G06F 3/017; G06F 3/0481; G06F 3/04883; G06F 21/83; G06F 1/3203
See application file for complete search history.

(56) References Cited

U.S. PATENT DOCUMENTS 5,991,883 A * 11/1999 Atkinson .............. G06F 1/3203
                                                            713/300
6,243,724 B1    6/2001 Mander et al.
(Continued)

FOREIGN PATENT DOCUMENTS

CN          1751497          3/2006
CN       100454218 C          1/2009
(Continued)

OTHER PUBLICATIONS

"Office Action Issued in Korean Patent Application No. 10-2016-7031321", dated Jul. 19, 2017, 4 Pages. Summary of Office Action in English, pg. 1.
(Continued)

*Primary Examiner* — Robert B Leung
(74) *Attorney, Agent, or Firm* — Ray Quinney & Nebeker, P.C.; Thomas M. Hardman; Gregg W. Wisdom

(57) ABSTRACT

A user request to display an application while the device is locked is received. In response to this user request, one or more images generated by the application are obtained and displayed while the device is locked. Additionally, an indication of an application to be displayed upon resuming operation from a power-saving mode can be received, and an image generated by the application is displayed in response to resuming operation from the power-saving mode.

17 Claims, 8 Drawing Sheets

Related U.S. Application Data continuation of application No. 12/546,216, filed on Aug. 24, 2009, now Pat. No. 8,434,153.

(51) Int. Cl.
| | | |
|---|---|---|
| *G06F 3/0488* | (2013.01) | |
| *H04M 1/67* | (2006.01) | |
| *G06F 3/01* | (2006.01) | |
| G06F 21/83 | (2013.01) | |
| H04W 52/02 | (2009.01) | |

(52) U.S. Cl.
CPC .......... *G06F 3/04883* (2013.01); *H04M 1/67* (2013.01); *G06F 21/83* (2013.01); *H04W 52/0209* (2013.01); *Y02D 70/164* (2018.01)

(56) References Cited

U.S. PATENT DOCUMENTS

| | | | |
|---|---|---|---|
| 6,353,449 B1 | 3/2002 | Gregg et al. | |
| 6,466,969 B1 | 10/2002 | Bunney et al. | |
| 6,574,484 B1 | 6/2003 | Carley | |
| 6,618,042 B1* | 9/2003 | Powell | G06F 1/263 |
| | | | 345/204 |
| 6,691,215 B1* | 2/2004 | Mirov | G06F 1/08 |
| | | | 327/147 |
| 6,892,081 B1 | 5/2005 | Elomaa | |
| 7,120,865 B1 | 10/2006 | Horvitz et al. | |
| 7,231,231 B2 | 6/2007 | Kokko et al. | |
| 7,453,443 B2 | 11/2008 | Rytivaara et al. | |
| 7,516,884 B2 | 4/2009 | Chase-Salerno et al. | |
| 7,660,864 B2 | 2/2010 | Markki et al. | |
| 7,881,283 B2 | 2/2011 | Cormier et al. | |
| 8,136,053 B1 | 3/2012 | Miller et al. | |
| 8,434,153 B2 | 4/2013 | Sundaramurthy et al. | |
| 8,830,181 B1 | 9/2014 | Clark | |
| 9,760,176 B2 | 9/2017 | Sundaramurthy et al. | |
| 2002/0070691 A1* | 6/2002 | Park | G06F 1/3203 |
| | | | 315/406 |
| 2003/0054862 A1 | 3/2003 | Chae et al. | |
| 2003/0074590 A1* | 4/2003 | Fogle | G06F 1/3203 |
| | | | 713/320 |
| 2004/0085351 A1 | 5/2004 | Tokkonen | |
| 2004/0093582 A1 | 5/2004 | Segura | |
| 2004/0121823 A1 | 6/2004 | Noesgaard et al. | |
| 2004/0243682 A1 | 12/2004 | Markki et al. | |
| 2005/0240880 A1 | 10/2005 | Banks et al. | |
| 2005/0289360 A1* | 12/2005 | Banginwar | G06F 1/3203 |
| | | | 713/300 |
| 2006/0003742 A1 | 1/2006 | Seligmann et al. | |
| 2006/0017692 A1 | 1/2006 | Wehrenberg et al. | |
| 2006/0114267 A1* | 6/2006 | Park | G06F 1/3203 |
| | | | 345/619 |
| 2006/0161749 A1 | 7/2006 | Chen et al. | |
| 2007/0014280 A1 | 1/2007 | Cormier et al. | |
| 2007/0016958 A1 | 1/2007 | Bodepudi | |
| 2007/0028176 A1 | 2/2007 | Perdomo et al. | |
| 2007/0107014 A1 | 5/2007 | Howard et al. | |
| 2007/0145680 A1 | 6/2007 | Rosenberg | |
| 2007/0150842 A1 | 6/2007 | Chaudhri et al. | |
| 2007/0177803 A1 | 8/2007 | Elias et al. | |
| 2007/0180492 A1 | 8/2007 | Hassan | |
| 2007/0207782 A1 | 9/2007 | Tran | |
| 2007/0260866 A1 | 11/2007 | Wang et al. | |
| 2007/0279419 A1 | 12/2007 | Seebach | |
| 2007/0280458 A1 | 12/2007 | Aberethy et al. | |
| 2007/0288582 A1 | 12/2007 | Major et al. | |
| 2008/0020803 A1 | 1/2008 | Rios et al. | |
| 2008/0040688 A1 | 2/2008 | Hoffman et al. | |
| 2008/0086387 A1 | 4/2008 | O'rourke et al. | |
| 2008/0094356 A1 | 4/2008 | Ording et al. | |
| 2008/0104595 A1 | 5/2008 | Kawachiya et al. | |
| 2008/0158117 A1* | 7/2008 | Wong | G09G 3/20 |
| | | | 345/87 |
| 2008/0200142 A1 | 8/2008 | Abdel-kader et al. | |
| 2008/0220752 A1 | 9/2008 | Forstall | |
| 2008/0288260 A1 | 11/2008 | Cho et al. | |
| 2008/0290985 A1* | 11/2008 | Vogedes | G06F 1/3215 |
| | | | 340/3.1 |
| 2008/0320496 A1 | 12/2008 | Barinov | |
| 2009/0005011 A1 | 1/2009 | Christie | |
| 2009/0051648 A1 | 2/2009 | Shamaie et al. | |
| 2009/0058842 A1 | 3/2009 | Bull et al. | |
| 2009/0061837 A1 | 3/2009 | Chaudhri et al. | |
| 2009/0137284 A1 | 5/2009 | Liyanaarachchi | |
| 2009/0262074 A1 | 10/2009 | Nasiri et al. | |
| 2009/0282130 A1 | 11/2009 | Antoniou et al. | |
| 2009/0282485 A1 | 11/2009 | Bennett | |
| 2009/0284482 A1 | 11/2009 | Chin | |
| 2009/0288032 A1 | 11/2009 | Chang et al. | |
| 2010/0001967 A1 | 1/2010 | Yoo | |
| 2010/0017759 A1 | 1/2010 | Birnbaum et al. | |
| 2010/0060586 A1 | 3/2010 | Pisula | |
| 2010/0077234 A1 | 3/2010 | Das | |
| 2010/0079380 A1 | 4/2010 | Nurmi | |
| 2010/0081414 A1 | 4/2010 | Poisner | |
| 2010/0123724 A1 | 5/2010 | Moore et al. | |
| 2010/0123734 A1 | 5/2010 | Ozawa et al. | |
| 2010/0146235 A1 | 6/2010 | Weber et al. | |
| 2010/0146384 A1 | 6/2010 | Peev et al. | |
| 2010/0146437 A1 | 6/2010 | Woodcock et al. | |
| 2010/0159995 A1 | 6/2010 | Stallings et al. | |
| 2010/0273457 A1 | 10/2010 | Freeman et al. | |
| 2010/0306705 A1 | 12/2010 | Nilsson | |
| 2011/0004845 A1 | 1/2011 | Ciabarra | |
| 2011/0040996 A1* | 2/2011 | Hackborn | G06F 11/3409 |
| | | | 713/340 |
| 2011/0047368 A1 | 2/2011 | Sundaramurthy et al. | |
| 2012/0046079 A1 | 2/2012 | Kim et al. | |
| 2013/0331072 A1 | 12/2013 | Forsyth | |

FOREIGN PATENT DOCUMENTS

| | | |
|---|---|---|
| EP | 0588083 B1 | 5/2003 |
| EP | 1569064 A1 | 8/2005 |
| EP | 1657895 B1 | 8/2007 |
| EP | 1953663 A1 | 8/2008 |
| EP | 2435897 A1 | 4/2012 |
| JP | 2001119453 A | 4/2001 |
| JP | 2007295176 A | 11/2007 |
| JP | 2008236184 A | 10/2008 |
| JP | 2009188549 A | 8/2009 |
| JP | 2010187228 A | 8/2010 |
| KR | 20030023809 A | 3/2003 |
| KR | 10-2003-0078077 A | 10/2003 |
| KR | 1020030078007 | 10/2003 |
| KR | 20040050332 A | 6/2004 |
| KR | 10-2004-0101269 A | 12/2004 |
| KR | 10-2005-0094405 A | 9/2005 |
| KR | 1020060016426 A | 2/2006 |
| KR | 20060079071 A | 7/2006 |
| KR | 1020060133427 A | 12/2006 |
| KR | 100673163 B1 | 1/2007 |
| KR | 100722278 B1 | 5/2007 |
| KR | 100795750 B1 | 1/2008 |
| KR | 100823871 | 4/2008 |
| KR | 20080041937 | 5/2008 |
| TW | 200844843 A | 11/2008 |
| WO | 03075258 | 9/2003 |
| WO | 2009032800 A2 | 3/2009 |
| WO | 2010136854 | 12/2010 |
| WO | 2011028458 | 3/2011 |

OTHER PUBLICATIONS

"Office Action Issued in European Patent Application No. 10814191. 2", dated Feb. 15, 2017, 8 Pages.

"Final Office Action Issued in U.S. Appl. No. 13/873,011", dated Jun. 24, 2015, 22 Pages.

"Final Office Action Issued in U.S. Appl. No. 13/873,011", dated May 25, 2016, 20 Pages.

"Non Final Office Action Issued in U.S. Appl. No. 13/873,011", dated Jan. 9, 2017, 20 Pages.

(56) References Cited

OTHER PUBLICATIONS

"Non Final Office Action Issued in U.S. Appl. No. 13/873,011", dated Dec. 23, 2015, 22 Pages.
"Non Final Office Action Issued in U.S. Appl. No. 13/873,011", dated Feb. 6, 2015, 27 Pages.
"Notice of Allowance Issued in U.S. Appl. No. 13/873,011", dated May 15, 2017, 8 Pages.
Canadian Intellectual Property Office, CA Office Action for Application No. 2,768,513, dated Jan. 11, 2017, 3 pages, Canada.
Korean Patent Office, Author unknown, KR Office Action for Application No. 10-2016-7031321, dated Jan. 23, 2017, pp. 1-2, Korea.
Korean Intellectual Property Office, Author unknown, KR Notice of Allowance of Patent for Application No. 10-2012-7004746, dated Aug. 11, 2016, p. 1, Korea.
Canadian Intellectual Property Office, CA Examiner's Report for Application No. 2,768,513, pp. 1-4, dated Jun. 29, 2016, Canada.
CN Notice on Grant of Patent Right for Invention for Application No. 201080037511.0, dated Mar. 29, 2016.
CN Decision on Reexamination for Application No. 201080037511. 0, dated Sep. 10, 2015.
KR Office Action for Application No. 10-2012-7004746, dated Feb. 25, 2016.
CN Notice on the Fourth Office Action for Application No. 201080037511.0, dated Nov. 25, 2015.
"Foreign Office Action", CN Application No. 201080037511.0, dated Mar. 5, 2015, 10 Pages.
"Foreign Office Action", CN Application No. 201080037511.0, dated Sep. 23, 2014, 13 Pages.
"Foreign Notice of Allowance", AU Application No. 2010289874, dated Oct. 22, 2014, 2 page.
"First Office Action Issued in Australian Patent Application No. 2010289874", dated Jun. 27, 2014, 3 Pages.
Notice of Allowance Issued in Japanese Patent Application No. 2012526864, dated Mar. 12, 2014, 4 Pages.
"Foreign Office Action", CN Application No. 201080037511.0, dated May 15, 2014, 10 Pages.
"Foreign Office Action", CN Application No. 201080037511.0, dated Jan. 20, 2014, 12 Pages.
"Apple Remote Desktop: How to Create a Custom Locked Screen Picture", dated Jul. 24, 2007, 1 Page.
"Calendar on Main Screen/Locked Screen?", Retrieved from < http://www.modmyi.com/forums/3rd-party-apps-reguests/21023-calendar-main-screen-locked-screen.html> on Jul. 10, 2009, 1 page.
"Final Office Action", U.S. Appl. No. 12/546,216, (dated May 9, 2012),13 pages.
"Foreign Office Action", European Patent Application No. 10814191. 2, (dated Dec. 3, 2012), 6 pages.
"How to Install and Use IntelliScreen for iPhone", iClarified, Retrieved from: <http://iclarified.com/entry/index.php?enid=1128> on Apr. 30, 2012, (May 14, 2008),12 pages.
"Intelliborn Knowledgebase", Retrieved from: <http://supportintelliborn.com/index.php?option=com_kb> on Nov. 17, 2011,(Dec. 20, 2008), 26 pages.
"IntelliScreen 2.2", Retrieved from: <http://www.intelliborn.com> on Nov. 17, 2011,(Jan. 5, 2009), 3 pages.
"IntelliScreen Makes Info Appear on Locked iPhone Screen", Retrieved from httlp://iphoneindia.gyanin.com/2008/05/15intelliscreen-makes-info-appear-on-locked-iphone-screen/ on Jul. 10, 2009, 7 Pages.
"Non-Final Office Action", U.S. Appl. No. 12/546,216 (dated Nov. 30, 2011),12 pages.
"Notice of Allowance", U.S. Appl. No. 12/546,216, (dated Jan. 3, 2013),15 pages.
"PCT Search Report and Written Opinion", Application No. PCT/US20101046278, (dated Apr. 29, 2011), 9 pages.
"RemindYou", Make Your Day Media, Retrieved from: <http://www.makeyourday.com/MoreInfo.htm> on Apr. 30, 2012, (Jul. 1, 2008), 2 pages.

"Supplementary European Search Report", European Patent Application No. 10814191.2, (dated Nov. 19, 2012), 3 pages.
Douglas, "RemindYou 1.0.2", Apple iPhone School, Retrieved from: <http://www.appleiphoneschool.com/2008/06/04/remindyou-102/> on Apr. 30, 2012,(Jun. 4, 2008), 2 pages.
Ebrahim, "Lock the Screen While in Full-Screen Mode in Windows Media Player", Retrieved from http://www.howtogeek.com/howto/windows-vista/lock-the-screen-while-infull-screen-mode-in-windows-media-plaverl/on Jul. 10, 2009. 2 Pages.
Robbins, Daniel C., "TapGlance: Designing a Unified Smartphone Interface for Personal Information Management", Microsoft Research, Available at <http://pim2008.ethz.ch/papers/pim2008-robbins.pdf>,(Apr. 1, 2008), 11 Pages.
"Office Action Issued in Canadian Patent Application No. 2,768,513", dated Jan. 25, 2018, 4 Pages.
"Capture—Definition and More from the Free Merriam-Webster Dictionary", Retrieved from http://www.merriamwebster.com/dictionary/capture, Jan. 5, 2012, 3 Pages.
"Desktop Lock 7-2-1", Retrieved from http://replay.waybackmachine.org/20081012104906/http://www.toplang.com/desktoplock.htm, Oct. 12, 2008, 2 Pages.
"Gumballtech", Retrieved from http://www.gumballtech.com/2009/11/21/iphone-lockscreen-battle-lockinfo-vs-cydgetsv, Nov. 17, 2011, 12 Pages.
"Intelliborn", Retrieved from http://web.archive.org/web/20080516231423/http://www.intelliborn.com, May 16, 2008, pp. 1-2.
"Intelliborn—Intelliscreen FAQs.pdf", Retrieved from http://web.archive.org/web/20080517141928/http://www.intelliborn.com/IntelliScreenFAQs.html, May 17, 2008, pp. 1-2.
"IntelliScreen 2.2 for iPhone 2.1/3G Firmware Released", Retrieved from http://web.archive.org/web/20080927061220/http://www.intelliborn.com, Sep. 27, 2008, 2 Pages.
"Organic Lock 0.81.5", Retrieved from http://www.1800pocketpc.com/2008/05/30/organic-lock-0815-an-almost-android-like-unlock-utility-for-pocketpc.html, May 30, 2008, 7 Pages.
"PocketShield v1.1.3—PPC Software", Retrieved from http://ppcmobiles.blogspot.com/2008/11/pocketshield-v113-ppc-software.html, Mar. 2, 2009, 6 Pages.
"Pop-Up Email Notifications", Retrieved from http://modmyi.com/forums/3rd-party-apps-requests/414421-pop-up-email-notifications.html, Sep. 6, 2011, 4 Pages.
"Program Lock Pro v2-12e", Retrieved from http://www.fileheap.com/software-program-lock-pro-download-26198.html, Apr. 8, 2007, 3 Pages.
"Slide to Unlock 2 [S2U2]1-50d—iphone like Slide to Lock Unlock for Windows Mobile", Retrieved from http://www.1800pocketpc.com/2009/02/26/slide-to-unlock-2-s2u2-150d-iphone-like-slide-to-lock-unlock-for-windows-mobile.html, Feb. 26, 2009, 8 Pages.
"Spb Mobile Shell 2-1 User Manual", Published by SPB Software, Dec. 2008, pp. 1-21.
"Sunscape—Slide to Lock-Unlock Utility", Retrieved from http://www.1800pocketpc.com/2008/09/01/sunscape-slide-to-lock-unlock-utility.html, Sep. 1, 2008, 8 Pages.
"ThrottleLock 0.3", Retrieved from http://www.1800pocketpc.com/2008/08/31/throttlelock-03-pattern-based-lock-like-on-android.html, Aug. 31, 2008, 7 Pages.
"Warden Security for Windows Mobile Smartphone", Retrieved from http://store.handmark.com/p/2086//Warden-Security-for-Windows-Mobile-Smartphone, Nov. 6, 2008, 6 Pages.
"What is the Gobbler—Yahoo! for Teachers", Retrieved from http://help.yahoo.com/l/us/yahoo/teachers/teachers-237717.html#, Apr. 2009,1 Page.
"Supplementary Search Report Issued in European Patent Application No. 09830844.8", dated Feb. 13, 2013, 6 Pages.
"Office Action Issued in Mexican Patent Application No. MX/a/2011/005928", dated Mar. 26, 2013, 4 Pages. (W/o English Translation).
"TalkLock by CeiiAvant—Free TouchScreen Lock App for BlackBerry Storm", Retrieved from http://www.multicellphone.com/talklock-by-cellavant-free-touchscreen-lock-app-for-blackberry-storm, Jan. 5, 2009, 5 Pages.

(56) References Cited

OTHER PUBLICATIONS

Miller et al., "The InfoCanvas—Information Conveyance through Personalized, Expressive Art", Retrieved from http://www.cc.gatech.edu/-john.stasko/papers/chi01.pdf, Apr. 2001, 2 Pages.
Miller Matthew, "Apple Files Notification Screen Patent, Is this Really that Unique", Retrieved from http://blogs.zdnet.com/cellphones/?=122, Sep. 19, 2008,1 Page.
Matthews et al., "Designing Glanceable Peripheral Displays", In Technical Report No. UCB/EECS-2006-113, University of California, Sep. 7, 2006, 11 Pages.
"S2U2 (Slide 2 Unlock 2)", Retrieved from http://web.archive.org/web/20081019021449/http://s2u2.eqvipage.dk/S2U2-index.html, Oct. 18, 2008, 3 Pages.
"Final Office Action Issued in U.S. Appl. No. 12/430,901", dated Nov. 21, 2013, 36 Pages.
"Final Office Action Issued in U.S. Appl. No. 12/430,901", dated Aug. 6, 2012, 33 Pages.
"Final Office Action Issued in U.S. Appl. No. 12/430,901", dated Sep. 19, 2011, 29 Pages.
"Non-Final Office Action Issued in U.S. Appl. No. 12/430,901", dated Jun. 13, 2013, 40 Pages.
"Non-Final Office Action Issued in U.S. Appl. No. 12/430,901", dated Jun. 28, 2011, 25 Pages.
"Non-Final Office Action Issued in U.S. Appl. No. 12/430,901", dated Jan. 30, 2012, 34 Pages.
"Final Office Action Issued in U.S. Appl. No. 12/474,281", dated Jan. 17, 2012, 33 Pages.
"Non-Final Office Action Issued in U.S. Appl. No. 12/474,281", dated Aug. 31, 2011, 26 Pages.
"Office Action and Issued in Australian Patent Application No. 2009322760", dated Mar. 7, 2014, 3 Pages.
"First Office Action Issued in Chinese Patent Application No. 200980149001.X", dated Mar. 31, 2012, 6 Pages.
"Second Office Action Issued in Chinese Patent Application No. 200980149001.X", dated Sep. 6, 2012, 6 Pages.
"Third Office Action Issued in Chinese Patent Application No. 200980149001.X", dated Oct. 18, 2012, 6 Pages.
"First Office Action Issued in Chinese Patent Application No. 200980149061.1", dated Apr. 16, 2012, 8 Pages.
"Second Office Action Issued in Chinese Patent Application No. 200980149061.1", dated Sep. 11, 2012, 6 Pages.
"Office Action Issued in Israel Patent Application No. 212300", dated Dec. 10, 2014, 2 Pages. (W/o English Translation).
"Office Action and Search Report Issued in Taiwan Patent Application No. 98139599", dated Mar. 4, 2015, 10 Pages.
"Office Action and Search Report Issued in Taiwan Patent Application No. 98139599", dated Oct. 20, 2014, 13 Pages.
Cadiz et al., "Sideshow—Providing Peripheral Awareness of Important Information", In Technical Report MSR-TR-2001-83, Sep. 14, 2001, 9 Pages.
Chewar, et al., "Unpacking Critical Parameters for Interface Design—Evaluating Notification Systems with the IRC Framework", In Proceedings of the 5th Conference on Designing Interactive Systems: Processes, Practices, Methods, and Techniques, Aug. 4, 2004,10 Pages.
Deleon, Nicholas, "Slide 2 Unlock—Slide to Unlock Any Pocket PC", Retrieved from http://www.crunchgear.com/2007/06/08/slide-2-unlock-slide-to-unlock-any-pocket-pc, Jun. 8, 2007, 8 Pages.
"European Search Report Issued in Patent Application No. 09830844.8", dated Feb. 13, 2013, 7 Pages.
Martellaro, John., "Security Flaw Allows Access to Screen Locked iPhone", Retrieved from http://www.ipodobserver.com/story/37028, Aug. 27, 2008, 3 Pages.
"International Search Report and Written Opinion Issued in PCT Application No. PCT/US09/64869", dated Jun. 16, 2010, 11 Pages.
"International Search Report and Written Opinion Issued in PCT Application No. PCT/US2009/066601", dated Jul. 15, 2010, 8 Pages.
"Six Essential Apple iPhone Security Tips", https://www.techworld.com.au/article/263077six_essentialappleiphone_security_tips?fp=4&fpid=303, Oct. 8, 2008, 2 Pages.
"Taking Your iPod touch to the Max", http://techbus.safaribooksonline.com/book/hardware-and-gadgets/9781430237327, Mar. 28, 2008, 4 Pages.
Thomas,. "Intelliscreen 2.1—Hello Quickview Source", Retrieved from http://isource.com/2008/09/01/intelliscreen-21-helloquickview, Sep. 1, 2008, 4 Pages.
Thomas., "Review—IntelliScreen 1.05", Retrieved from http://isource.com/2008/06/22/review-intelliscreen-105/, Source.com, Jun. 22, 2008, pp. 2-9.
Zhang, et al., "Info-Lotus—A Peripheral Visualization for Email Notification", In Proceedings of CHI'05 Extended Abstracts on Human Factors in Computing Systems, Apr. 2, 2005, 4 Pages.
"Office Action Issued in Korean Patent Application No. 10-2018-7009427", dated Apr. 19, 2018, 6 Pages.
"Iphone—News and Advices, pwnplayer—A New Media Player", Retrieved from http://ironphone.ru/page/11, Sep. 24, 2008, 9 Pages.
"Office Action Issued in Indian Patent Application No. 03736/CHENP/2011", dated Oct. 25, 2018, 5 Pages.
"Office Action Issued in Canadian Patent Application No. 2,768,513", dated Dec. 21, 2018, 3 Pages.
"Office Action Issued in Indian Patent Application No. 894/CHENP/2012", dated Jan. 1, 2019, 6 Pages.
"Office Action Issued in Canadian Patent Application No. 2,768,513", dated Jul. 30, 2019, 4 Pages.
"Office Action Issued in Brazilian Patent Application No. PI0920057-6", dated Jul. 17, 2019, 5 Pages.

\* cited by examiner

APPLICATION DISPLAY ON A LOCKED DEVICE

RELATED APPLICATIONS

This Application is a Continuation of and claims benefit from or priority of U.S. patent application Ser. No. 13/873,011 that was filed Apr. 29, 2013, and that is a Continuation of U.S. patent Ser. No. 12/546,216 (U.S. Pat. No. 8,434,153), filed Aug. 24, 2009 (Issued Apr. 30, 2013), each of which is incorporated herein by reference in its entirety.

BACKGROUND

Mobile communications devices, such as wireless phones, have become increasingly commonplace. Due to their typically small size, such mobile communications devices can oftentimes be easily kept in a pocket, briefcase, purse, etc. Storing mobile communications devices in such locations can be problematic because the devices can be accidentally activated, causing unwanted actions to be performed by the devices. To prevent such accidental activation, some mobile communications devices can be locked by a user entering a particular key sequence, and then unlocked by the user entering another particular key sequence. When locked, the device typically accepts no inputs (except inputs to unlock the device), and displays some default or generic screen to the user. While such locking prevents accidental activation of the device, it is not without its problems. One such problem is that locking and unlocking the device can be a time-consuming and cumbersome process for the user, which can result in frustrating experiences when users are trying to use the mobile communications devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a user request to display an application while the device is locked is received. In response to the user request to display the application while the device is locked, an image generated by the application is obtained and displayed while the device is locked.

In accordance with one or more aspects, an indication of an application to be displayed upon resuming operation from a power-saving mode is received. An image generated by the application is displayed in response to resuming operation from the power-saving mode.

BRIEF DESCRIPTION OF THE DRAWINGS

The same numbers are used throughout the drawings to reference like features.

DETAILED DESCRIPTION

Application display on a locked device is discussed herein. A user of a device can request, such as with a simple finger gesture, that a particular application be displayed while the device is locked. In response to the request, images generated by the application continue to be displayed while the device is locked. The images displayed can change as the application runs while the device is locked, allowing the user to continually view updates from the application despite the device being locked. Alternatively, the device can be locked and placed in a power-saving mode in which no images are displayed. Upon resuming from the power-saving mode, the device remains locked but is also displaying images generated by a particular application requested by the user.

Figure 1:
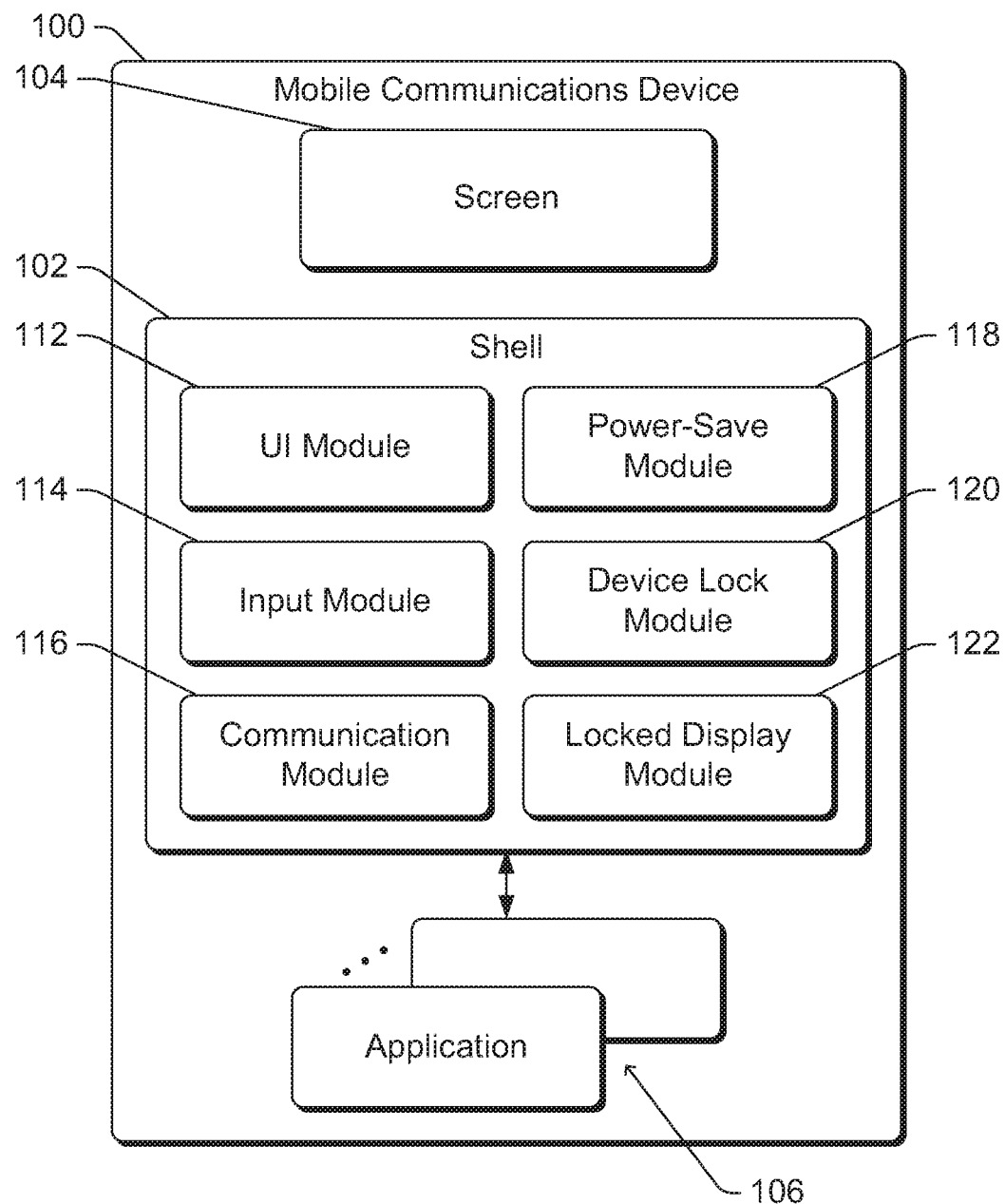
FIG. 1 illustrates an example mobile communications device implementing the application display on a locked device in accordance with one or more embodiments.

FIG. 1 illustrates an example mobile communications device 100 implementing the application display on a locked device in accordance with one or more embodiments. A mobile communications device refers to a communications device capable of sending and receiving communications, such as phone calls, text messages, messages including other content types, and so forth. Communications device 100 is referred to as being mobile because it is typically designed to be moved and used in different locations by users. Mobile communications device 100 can be a variety of different types of devices, such as a cellular phone, a satellite phone, other types of wireless phones, a handheld computer, a personal digital assistant (PDA), an audio and/or video playback device, a portable game device, an automotive computer, a dedicated messaging device, a netbook, and so forth. It is to be appreciated that mobile communications device 100 can include functionality in addition to being able to send and receive communications calls, such as calendar functionality, audio and/or video playback functionality, mapping or location-tracking functionality, and so forth. Although some discussions herein refer to the application display on a locked device being implemented on a mobile communications device, it is to be appreciated that the application display on a locked device can alternatively be implemented on other types of devices.

Mobile communications device 100 includes a shell module 102, a screen 104, and one or more applications 106. Shell module 102 includes a user interface (UI) module 112, an input module 114, a communication module 116, a power-save module 118, a device lock module 120, and a locked display module 122. Each of modules 102, 112, 114, 116, 118, 120, and 122 can be implemented in software, firmware, hardware, or combinations thereof. When implemented in software or firmware, such a module includes one or more instructions that are executed by one or more processors or controllers of mobile communications device 100.

Screen 104 is a display component of mobile communications device 100. Screen 104 can be implemented in a variety of different manners, such as using liquid crystal display (LCD) technology, plasma screen technology, image projection technology, and so forth. Alternatively, rather than including screen 104, mobile communications device 100 can generate one or more signals that are output to one or more other display devices which include screen 104.

Shell module 102 includes one or more modules that manage communications, receive user inputs, display images, and so forth as discussed in more detail below. Applications 106 communicate with shell module 102 and provide various functionality. Applications 106 typically rely on shell module 102 to manage receiving of user inputs on behalf of the applications 106, and displaying images generated by applications 106 on screen 104. A variety of different types of applications can be included as applications 106, such as productivity applications (e.g., spreadsheet applications, word processing applications), recreational applications (e.g., games), resource applications (e.g., databases, digital books), audio/video applications (e.g., digital cameras, digital video cameras, music playback programs), mapping or tracking applications, and so forth.

Input module 114 receives user inputs from a user of mobile communications device 100. User inputs can be provided in a variety of different manners, such as by pressing a particular portion of a touchpad or touchscreen of device 100, or pressing one or more keys of a keypad or keyboard of device 100. Touchscreen functionality can be provided using a variety of different technologies, such as through capacitive, surface acoustic wave, resistive, optical, strain gauge, dispersive signals, acoustic pulse, or other touchscreen technologies. The user input can also be provided in other manners, such as via audible inputs, other physical feedback input to the device (e.g., tapping any portion of device 100 or another action that can be recognized by a motion detection component of device 100, such as shaking device 100, rotating device 100, etc.), and so forth.

UI module 112 generates, manages, and/or outputs a user interface for display on screen 104. This user interface displays various information on screen 104, and user inputs can be received by input module 114 as discussed above. UI module 112 can display, for example, messages sent by mobile communications device 100 to other devices, messages received by mobile communications device 100 from other devices, images generated by applications 106, and so forth.

Communication module 106 manages receiving of communications from and sending of communications to other devices, including other mobile devices. Mobile communications device 100 can communicate with other devices using a variety of different technologies and protocols, such as cellular, satellite, and/or other technologies or protocols. The technologies or protocols can include wireless and/or wired technologies and protocols.

Communication module 106 supports one or more of a variety of different types of communications with other devices. One type of communication typically supported by communication module 106 is a voice call. This can include voice calls that are initiated by mobile communications device 100 (e.g., outgoing calls), as well as voice calls that are initiated by other devices (e.g., incoming calls). Alternatively, mobile communications device 100 can support other types of communications, and need not support voice calls.

Another type of communication supported by communication module 106 is a message, which refers to text messages or messages with other types of media such as images, video, audio, combinations of types of media, and so forth. Such messages can comply, for example, with the Short Message Service (SMS) communication protocol or the Multimedia Messaging Service (MMS) communication protocol. Various other types of communications can also be supported by communication module 106, such as mobile instant messaging (mobile IM), email (electronic mail), and so forth.

Power-save module 118 manages power saving functionality for mobile communications device 100. This functionality is typically designed to conserve one or more batteries powering device 100. Power-save module 118 supports various power-saving modes implementing various power saving functionality, such as decreasing the brightness of screen 104, turning off screen 104, reducing the operating speed and/or power of a processor of device 100, turning off one or more input/output components of device 100, and so forth. Different types of power saving functionality can be implemented by power-save module 118, and which power saving functionality is implemented at which times can vary. For example, power-save module 118 can be configured to enter a first power-saving mode by decreasing the brightness of screen 104 after a first amount of time has passed with no user input being received by module 114, and to enter a second power-saving mode by turning off the screen 104 after a second amount of time has passed with no user input being received by module 114.

Device lock module 120 manages the locking of mobile communications device 100. Device 100 is locked to prevent accidental activation of the device. When device 100 is locked, module 120 prevents most inputs received by input module 114 from being acted upon by device 120. This prevention can be performed in different manners, such as module 120 intercepting and ignoring such inputs, module 120 informing input module 114 to ignore such inputs, and so forth. When device 100 is locked, device lock module 120 monitors inputs received by input module 114 for a particular input. This particular input is, for example, activation or selection of a particular key or button, activation or selection of a particular key sequence or button sequence, inputting of a particular gesture, and so forth. This particular input is interpreted by device lock module 120 as a user request to unlock mobile communications device 100.

In response to a user request to unlock mobile communications device 100, device lock module 120 unlocks device 100. When unlocked, module 120 no longer prevents inputs received by module 114 from being acted upon by device 120. For example, module 120 can stop intercepting and ignoring such inputs, module 120 can inform input module 114 to no longer ignore such inputs, and so forth.

Locked display module 122 manages the display of images from an application 106 while mobile communications device 100 is locked. Rather than displaying a generic image on screen 104 when device 100 is locked, module 122 allows images generated by an application 106 to be displayed while device 100 is locked. As the application 106 runs and updates the images it displays, at least some of these updated images are displayed by module 122 on screen 104.

In one or more embodiments, a user of mobile communications device 100 inputs a request via input module 114 for a particular application to be displayed while device 100 is locked. In response to such a request, locked display module 122 displays images generated by the particular application while device 100 is locked. The user request can be input in a variety of different manners via input module 114. For example, the user request can be input by the user entering a gesture with his or her finger via a touchscreen or touchpad (e.g., a circle, the letter "Z", etc.), by the user selecting a menu item (e.g., a "display when locked" menu item), by the user moving the device in a particular manner (e.g., rotating the device, tapping the device twice in quick succession, etc.), and so forth.

One or more different applications 106 can be run on mobile communications device 100, including running multiple applications 106 concurrently. Multiple applications 106 can be run concurrently on device 100 in a variety of different conventional manners. The multiple applications typically have a depth ordering, with applications being viewed as running at particular depths or Z-orders. Which application is at which depth or level changes based on user requests to use the applications, such as more recently requested applications being a higher level than less recently requested applications. The top-level application of applications 106 can change, and is typically the application that is currently being used (or was most recently used or selected) by the user. This top-level application at any particular time is also typically the application that is being displayed on screen 104 at that particular time.

In one or more embodiments, locked display module 122 displays images generated by the top-level application 106 at the time the user request for a particular application to be displayed while device 100 is received. Accordingly, the user can easily request that a particular application be displayed while device 100 is locked by having that particular application be the top-level application, and then entering the request for the application to be displayed while device 100 is locked.

Figure 2:
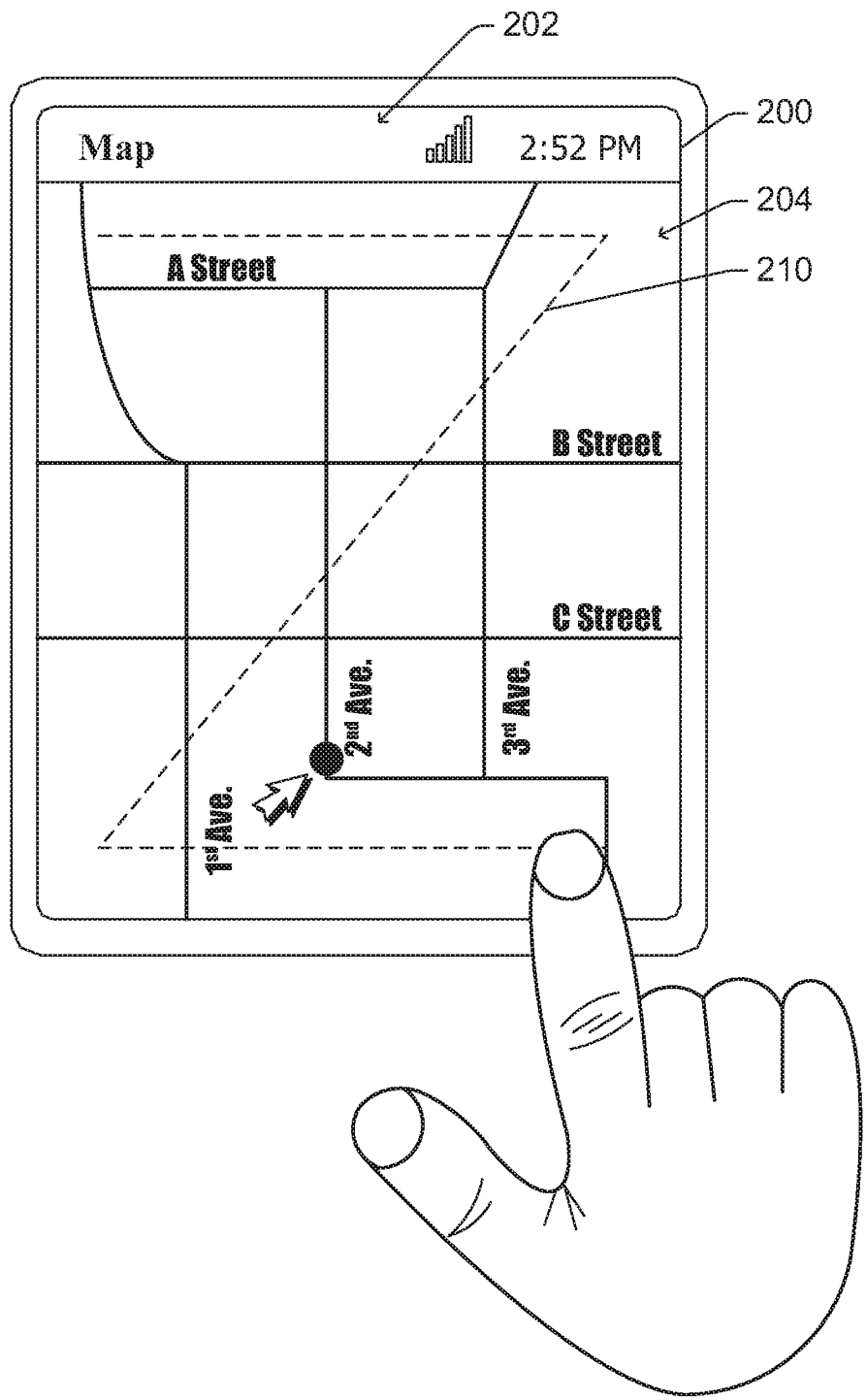
FIG. 2 is a diagram illustrating an example screen display of a mobile communications device in accordance with one or more embodiments.

FIG. 2 is a diagram illustrating an example screen display of a mobile communications device in accordance with one or more embodiments. In FIG. 2, a screen 200 is displayed having a header portion 202 and an application display portion 204. Images generated by an application running on the mobile communications device are displayed in application display portion 204, while information describing those applications and/or the operation of the mobile communications device is displayed in header portion 202. For example, header portion 202 can include a name of the application being displayed in portion 204 ("Map"), one or more vertical bars indicating the strength of a wireless signal being received by the mobile communications device, and a current time. It is to be appreciated, however, that different and/or additional information can be displayed in header portion 202.

In the example of FIG. 2, the application running on the mobile communications device is a map application that displays the current location of the mobile communications device on a map. Various streets are illustrated in display portion 204, along with an arrow and large dot to identify the current location of the mobile communications device. The current location of the mobile communications device can be determined in a variety of different manners, such as based on Global Positioning System (GPS) signals received by the mobile communications device, based on signals or information received from cellular towers or other wireless base stations, and so forth. It is to be appreciated that the map application is an example, and that alternatively images generated by other applications can alternatively be displayed in display portion 204.

FIG. 2 illustrates an example of a user request being entered by a user with a gesture of his or her finger. The gesture illustrated in FIG. 2 is a large "Z" shape, which is illustrated as broken line 210. The input of this "Z" shape is interpreted by locked display module 122 of FIG. 1 as a user request for a particular application to be displayed while the mobile communications device is locked. The particular application is the application being displayed when the gesture is made, which is the map application in FIG. 2.

Figure 3:
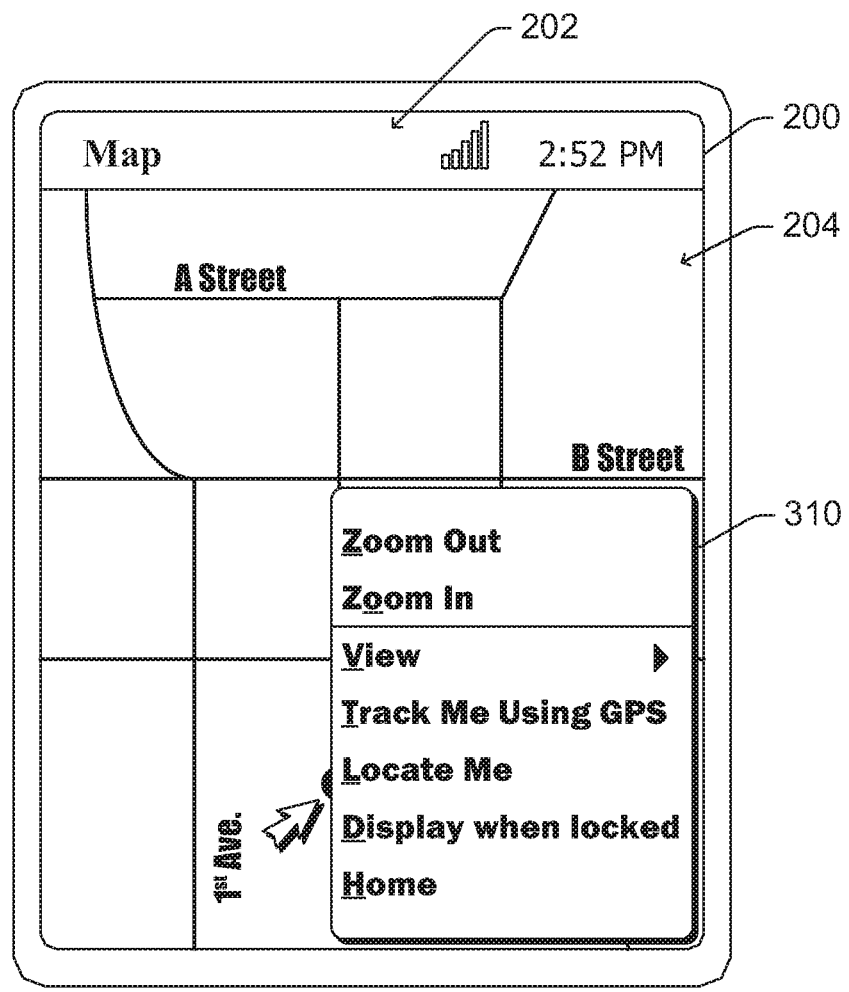
FIG. 3 is a diagram illustrating another example screen display of a mobile communications device in accordance with one or more embodiments.

FIG. 3 is a diagram illustrating another example screen display of a mobile communications device in accordance with one or more embodiments. In FIG. 3, screen 200 is displayed having a header portion 202 and an application display portion 204 as discussed above with reference to FIG. 2. However, FIG. 3 illustrates an example of a user request being entered by a user selection of a menu item.

In FIG. 3, a menu 310 is displayed including various menu items from which the user can select. Menu 310 can be displayed in response to a variety of different commands, such as user selection of a "menu" button or key, the user entering a particular gesture with his or her finger and/or providing physical feedback to the mobile communications device in a particular manner, and so forth. Menu 310 includes a "display when locked" menu item, which can be selected by the user. The user can select menu items in a variety of different manners, such as by touching the displayed menu item with his or her finger, navigating the menu items using directional buttons and pressing a "select" or "ok" button when the menu item is highlighted, and so forth. The user selection of the "display when locked" menu item is interpreted by locked display module 122 of FIG. 1 as a user request for a particular application to be displayed while the mobile communications device is locked. The particular application is the application being displayed when the menu item selection is made, which is the map application in FIG. 3.

Returning to FIG. 1, mobile communications device 100 can be locked at some time after a user request for a particular application to be displayed while device 100 is locked is received. Device 100 can be locked in response to a user request, or alternatively in response to some other action or event (e.g., after a particular amount of time of no user input being received by device 100). In one or more embodiments, the user request for a particular application to be displayed while device 100 is locked is also a request to lock device 100, although alternatively the request to lock device 100 can be a separate user input.

Additionally, in response to a request for an application to be displayed while device 100 is locked, locked display module 122 prevents the power saving functionality provided by power-save module 118 from entering a power-saving mode. In one or more embodiments, locked display module 122 notifies power-save module 118 that module 118 should cease its power saving functionality. In response to such a notification, power-save module 118 ceases performing its power saving functionality, such as decreasing the brightness of screen 104 and/or turning off screen 104, by not entering power-saving modes. This cessation of the power saving functionality continues until power-save module 118 is notified to resume its power saving functionality (e.g., by device lock module 120 in response to device 100 being unlocked).

Alternatively, rather than not entering a power-saving mode, power-save module 118 can alter its entering a power-saving mode. This alteration can include not entering certain power-saving modes and/or changing the time of when certain power-saving modes are entered. For example, power-save module 118 may normally enter a first power-saving mode by decreasing the brightness of screen 104 after a first amount of time of no user input being received, and then enter a second power-saving mode by turning off screen 104 after a second amount of time of no user input being received. Power-save module 118 can alter this functionality to not enter the first power-saving mode, but may still enter the second-power saving mode after a particular amount of time of no user input being received (which may be the same amount of time as the second amount of time, or alternatively may be a longer or shorter amount of time).

Whether to enter and/or when to enter a power-saving mode can be determined in different manners. In one or more embodiments, power-save module 118 is configured with an indication of when (and whether) to enter particular power-saving modes in response to a notification to cease power saving functionality received from locked display module 122. Alternatively, an indication of when (and whether) to enter particular power-saving modes can be provided by locked display module 122 and/or the application 106 to be displayed while device 100 is locked.

Alternatively, locked display module 122 can determine when (and whether) device 100 is to enter particular power-saving modes in other manners. For example, locked display module 122 can intercept commands issued by power-save module 118, such as commands to turn off screen 104, commands to reduce the brightness of screen 104, and so forth. These intercepted commands can be deleted (so that they are not performed) and/or altered by locked display module 122.

Locked display module 122 displays images generated by a particular application 106 while device 100 is locked, and can display these images in a variety of different manners. In one or more embodiments, the particular application 106 continues to run while device 100 is locked, generating images for display as if device 100 were not locked. Locked display module 122 provides these images to a display driver associated with screen 104 in a same manner as when device 100 is not locked, which displays the images as if device 100 were not locked.

Alternatively, locked display module 122 can display images generated by a particular application 106 in other manners. For example, the particular application 106 can continue to run and generate images for display while device 100 is locked, but locked display module 122 does not provide all of these images to the display driver associated with screen 104. Rather, locked display module 122 selects images at regular or irregular intervals (e.g., every ten or fifteen seconds, every minute, etc.), and provides those selected images to the display driver associated with screen 104. These intervals can vary based on application 106. For example, it may be desirable to have more frequent updates for an application 106 that is a mapping application than for an application 106 that is a stock quote application.

Whether images generated by an application 106 are displayed as if device 100 were not locked, or whether images generated by an application 106 are displayed at some other interval, application 106 need have no knowledge that device 100 is locked. Rather, application 106 continues running until receiving a notification from shell 102 to cease running.

Alternatively, application 106 can be notified (e.g., by locked display module 122) that device 100 is locked, and in response the behavior of application 106 can be altered. For example, application 106 can invoke a method of an application programming interface (API) exposed by locked display module 122 to provide module 122 with images to be displayed while device 106 is locked. Module 122 receives these images and provides the received images to the display driver associated with screen 104. The particular images generates for display while device 106 is locked, and the frequency with which those particular images are generated, is determined by the application 106.

Regardless of the manner in which locked display module 122 displays images generated by application 106 while device 100 is locked, user inputs to application 106 are prevented because device 100 is locked. Thus, the user is able to continue to see the images generated or otherwise output by application 106, but is not able to provide inputs to application 106 until device 100 is unlocked.

Figure 4:
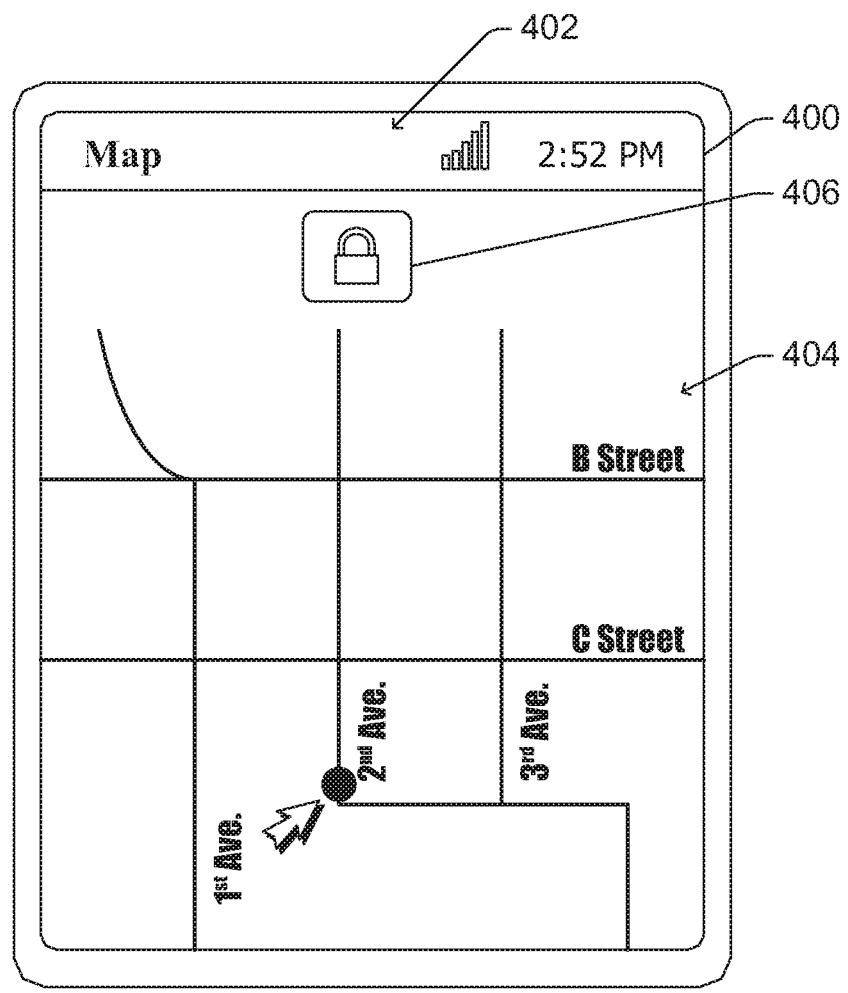
FIG. 4 is a diagram illustrating an example screen display of a locked mobile communications device in accordance with one or more embodiments.

FIG. 4 is a diagram illustrating an example screen display of a locked mobile communications device in accordance with one or more embodiments. In FIG. 4, screen 400 is displayed having a header portion 402 and an application display portion 404, analogous to header portion 202 and application display portion 402 of FIG. 2. As shown in FIG. 4, an image from the map application is displayed in display portion 404 even though the device is locked.

Screen 400 also includes a lock button 406. Lock button 406 can be displayed in application display portion 404 by locked display module 122 or alternatively another module or application. For example, locked display module 122 can generate an overlay that is lock button 406 and provide the overlay along with the image from the map application to the display driver associated with screen 400. Alternatively, lock button 406 can be displayed elsewhere, such as in header portion 402.

Lock button 406 signifies to a user of the mobile communications device that the mobile communications device is currently locked. Lock button 406 can be selected by the user in a variety of different manners to request that the mobile communications device be unlocked, such as by pressing lock button 406, tapping lock button 406 a particular number of times in rapid succession, pressing and sliding lock button 406 to the left or right, and so forth. Such a request to unlock the device is typically followed by user entry of particular character or number sequence, or some other code or pattern, to unlock the device.

Figure 5:
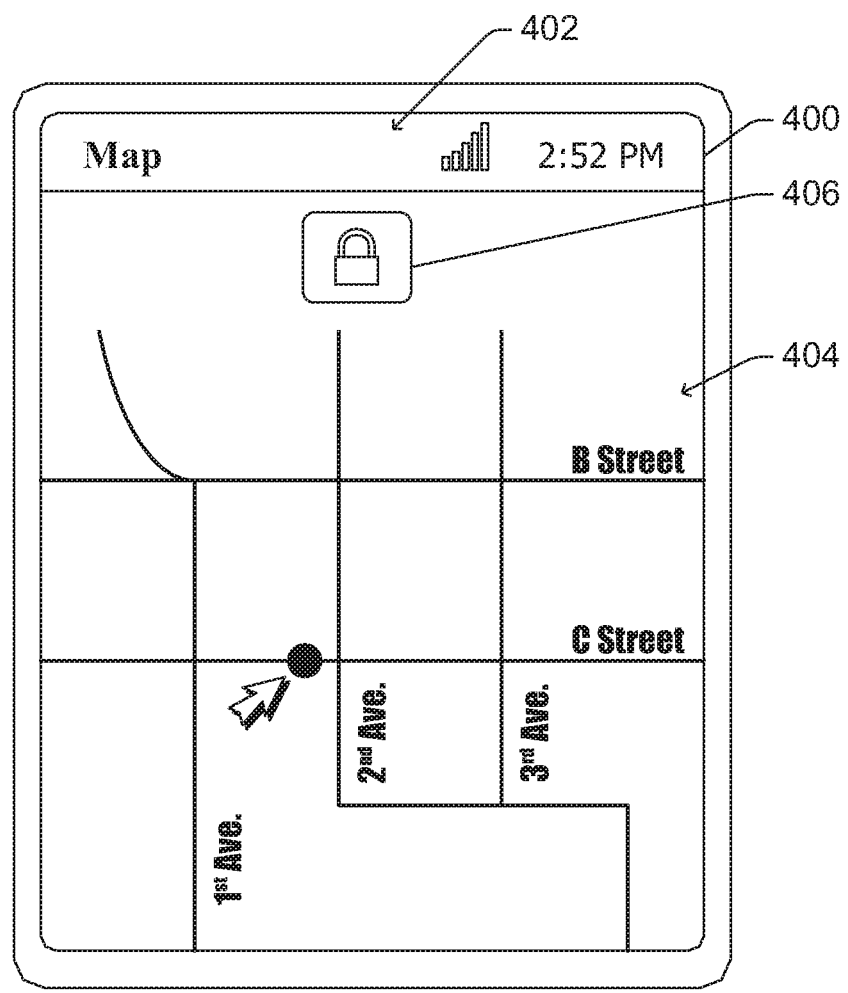
FIG. 5 is a diagram illustrating another example screen display of a locked mobile communications device in accordance with one or more embodiments.

FIG. 5 is a diagram illustrating another example screen display of a locked mobile communications device in accordance with one or more embodiments. In FIG. 5, screen 400 is displayed having a header portion 402, an application display portion 404, and a lock button 406 as discussed above with reference to FIG. 4.

In FIG. 5, however, the image displayed in application display portion 404 is different than the image illustrated in FIG. 4. This change in images displayed in portion 404 is a result of a different image being generated by the map application being displayed in portion 404 while the map application is running.

Thus, as can be seen in the examples of FIGS. 4 and 5, screen 400 displays images generated by the map application in application display portion 404. These images are displayed even though the mobile communications device is locked. These images also change over time as new images are generated by the map application as the map application runs while the mobile communications device is locked.

Additionally, it can be seen from the discussions herein that the application display on a locked device techniques allow a user to quickly and easily identify an application to be displayed while the mobile communications device is locked. For example, the user can simply enter on a touchscreen a particular gesture with his or her figure while the desired application is being displayed, and that desired application becomes the application displayed while the device is locked. Thus, the user can have his or her device locked and at the same time be able to continue to monitor the application and see images generated by the application. The user is able to see these images without needing to repeatedly unlock the device, check the application, and relock the device.

Returning to FIG. 1, locked display module 122 displays images generated by an application 106 while device 100 is locked in response to a user request for a particular application to be displayed while device 100 is locked. It should be noted that device 100 can still be locked in a more traditional manner, such as in response to a user request for a traditional locking of device 100, after a particular amount of time has elapsed with no user input, and so forth. In such situations, a generic image is displayed to the user while screen 104 is turned on and device 100 is locked. This generic image, however, is not based on images generated by application 106 while device 100 is locked.

Additionally, as discussed above situations can arise where power-save module 118 enters a power-saving mode (e.g., turns off screen 104) while mobile communications device 100 is locked. In one or ore embodiments, locked display module 122 displays images generated by an application 106 after device 100 resumes operation from the power-saving mode (e.g., after screen 104 is turned back on by power-save module 118). The particular application 106 whose generated images are displayed by locked display module 122 can be determined in different manners. For example, the particular application 106 whose generated images are displayed by locked display module 122 can be the application for which a user request for a particular application to be displayed while device 100 is locked is received. By way of another example, the particular application 106 whose generated images are displayed by locked display module 122 can be the top-level application at the time device 100 is locked (or enters a power-saving mode). By way of yet another example, the particular application 106 whose generated images are displayed by locked display module 122 can be a user-specified application identified in a user configuration or parameter setting. It should be noted that locked display module 122 can display images generated by an application when resuming from a power-saving mode regardless of whether a user request for a particular application to be displayed while device 100 is locked is received.

Locked display module 122 can determine when device 100 has resumed operation from a power-saving mode in a variety of different manners. In one or more embodiments, power-save module 118 notifies locked display module 122 that device 100 has resumed operation from a power-saving mode. Alternatively, locked display module 122 can determine when device 100 has resumed operation from a power-saving mode, such as intercepting commands issued by power-save module 118, identifying settings or state of other components or modules of device 100 (e.g., identifying whether screen 104 is turned on), and so forth.

For example, a user request for a particular application to be displayed while device 100 is locked can be received. Device 100 is subsequently locked, and after a particular amount of time device 100 enters a power-saving mode by power-save module 118 turning off screen 104. Device 100 can subsequently resume operation from the power-saving mode, such as in response to a user input being received via input module 114, by power-save module 118 turning back on screen 104. Device 100 is still locked, but locked display module 122 displays images generated by the particular application 106.

By way of another example, no user request for a particular application to be displayed while device 100 is locked may be received. Device 100 is subsequently locked and a generic image is displayed on screen 104. After a particular amount of time device 100 enters a power-saving mode by power-save module 118 turning off screen 104. Device 100 can subsequently resume operation from the power-saving mode, such as in response to a user input being received via input module 114, by power-save module 118 turning back on screen 104. Device 100 is still locked, but locked display module 122 displays images generated by the particular application 106 rather than the generic image.

Additionally, in one or more embodiments a user of device 100 can elect to opt out of having a particular one or more applications displayed while device 100 is locked. This allows the user to prevent images from being displayed by an application that may display images that include sensitive data (e.g., confidential work emails) or other images that the user desires not to be displayed. The user can select these particular one or more applications in a variety of manners, such as entering a particular gesture while the application is the top-level application, selecting a menu item while the application is the top-level application, accessing a configuration menu or window of the application, and so forth. Alternatively, all applications can default to being opted out of being displayed while device 100 is locked, and the user can elect to opt in to having a particular one or more applications displayed while device 100 is locked. The user can select these particular one or more applications in a variety of manners, such as entering a particular gesture while the application is the top-level application, selecting a menu item while the application is the top-level application, accessing a configuration menu or window of the application, and so forth.

Figure 6:
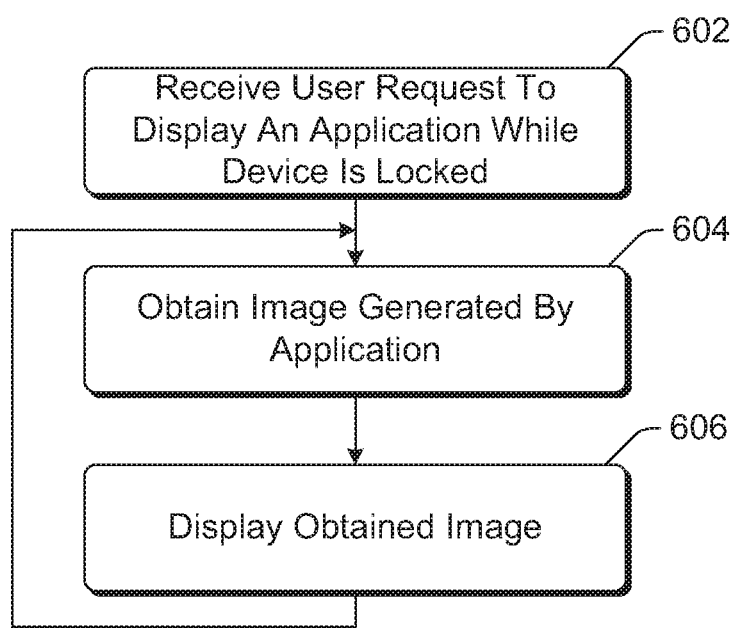
FIG. 6 is a flowchart illustrating an example process for application display on a locked device in accordance with one or more embodiments.

FIG. 6 is a flowchart illustrating an example process 600 for application display on a locked device in accordance with one or more embodiments. Process 600 is carried out by a device, such as mobile communications device 100 of FIG. 1, and can be implemented in software, firmware, hardware, or combinations thereof. Process 600 is an example process for application display on a locked device; additional discussions of application display on a locked device are included herein with reference to different figures.

In process 600, a user request to display an application while the device is locked is received (act 602). This user request can be received in a variety of different manners, such as input of a user gesture, selection of a menu item, and so forth.

In response to the user request received in act 602, an image generated by the application is obtained (act 604) and displayed (act 606). This image is obtained and displayed while the device is locked as discussed above. Acts 604 and 606 can be repeated multiple times, allowing multiple images generated by an application to be displayed while the device is locked as discussed above. Acts 604 and 606 can be repeated until a user request to unlock the device is received, or another module (e.g., power-save module 118) indicates to cease displaying the images.

Figure 7:
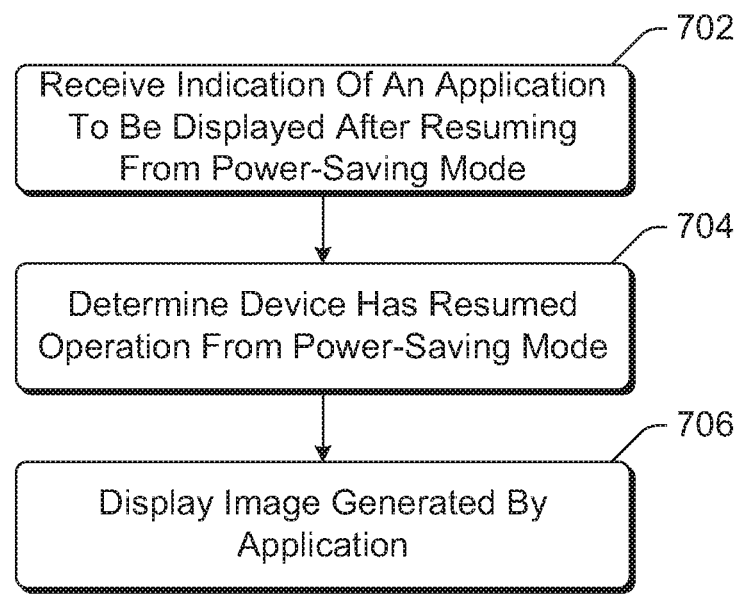
FIG. 7 is a flowchart illustrating another example process for application display on a locked device in accordance with one or more embodiments.

FIG. 7 is a flowchart illustrating another example process 700 for application display on a locked device in accordance with one or more embodiments. Process 700 is carried out by a device, such as mobile communications device 100 of FIG. 1, and can be implemented in software, firmware, hardware, or combinations thereof. Process 700 is an example process for application display on a locked device; additional discussions of application display on a locked device are included herein with reference to different figures.

In process 700, an indication of an application to be displayed after resuming from a power-saving mode is received (act 702). This indication can be received in a variety of different manners as discussed above, such as a configuration setting input by the user.

After the device has entered a power-saving mode, a determination is made that the device has resumed operation from the power-saving mode (act 704). This determination can be made in a variety of manners, such as in response to a notification from a power-save module (e.g., module 118 of FIG. 1) that the device has resumed from the power-saving mode.

In response to the device resuming operation from the power-saving mode, an image generated by the application is displayed (act 706). This application is the application for which the indication was received in act 702, and the image generated by the application is generated after the device resumes operation from the power-saving mode. Accordingly, the image generated is a current output or image of the application when the device resumes operation form the power-saving mode. Additionally, multiple images from this application can be displayed while the device remains locked, as discussed above. The display of such images can continue until a user request to unlock the device is received, or another module (e.g., power-save module 118) indicates to cease displaying the images.

Figure 8:
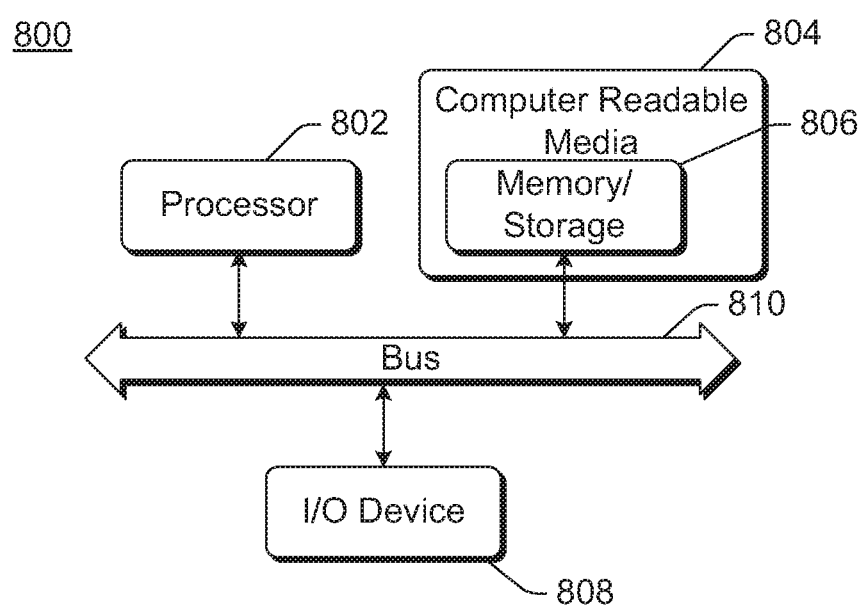
FIG. 8 illustrates an example computing device that can be configured to implement the application display on a locked device in accordance with one or more embodiments.

FIG. 8 illustrates an example computing device 800 that can be configured to implement the application display on a locked device in accordance with one or more embodiments. Computing device 800 can be, for example, mobile communications device 100 of FIG. 1.

Computing device 800 includes one or more processors or processing units 802, one or more computer readable media 801 which can include one or more memory and/or storage components 806, one or more input/output (I/O) devices 808, and a bus 810 that allows the various components and devices to communicate with one another. Computer readable media 804 and/or one or more 110 devices 808 can be included as part of, or alternatively may be coupled to, computing device 800. Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or nonvolatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 802. It is to be appreciated that different instructions can be stored in different components of computing device 800, such as in a processing unit 802, in various cache memories of a processing unit 802, in other cache memories of device 800 (not shown), on other computer readable media, and so forth. Additionally, it is to be appreciated that the location where instructions are stored in computing device 800 can change over time.

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 8. The features of the application display on a locked device techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed on a computing device, the method comprising:
   locking, by the computing device, the computing device, wherein when the computing device is locked, the computing device acts on fewer inputs than when the computing device is unlocked;
   altering power-saving functionality that applies while the computing device is locked;
   entering into a first power-saving mode when the computing device is locked;
   preventing, by the computing device, the computing device from powering off a display device of the computing device while the computing device is locked and in the first power-saving mode; and
   transitioning from the first power-saving mode into a second power-saving mode, wherein the display device is powered off in the second power-saving mode.

2. The method of claim 1, wherein entering into the first power-saving mode comprises decreasing brightness of the display device of the computing device.

3. The method of claim 1, wherein entering into the first power-saving mode comprises displaying an image on the display device of the computing device.

4. The method of claim 1 further comprising notifying, by the computing device, at least one application running on the computing device that the computing device is locked.

5. The method of claim 1 further comprising intercepting, by the computing device, a command for decreasing brightness of the display device of the computing device.

6. The method of claim 1 further comprising intercepting, by the computing device, a command for turning off the display device of the computing device.

7. A computing device comprising:
   a display device;
   at least one processor that is coupled to the display device;
   memory that is coupled to the at least one processor and that includes computer-readable instructions that, based on execution by the at least one processor, configure the computing device to perform actions comprising:
   locking, by the computing device, the computing device, wherein when the computing device is locked, the computing device acts on fewer inputs than when the computing device is unlocked;
   altering power-saving functionality that applies while the computing device is locked;
   entering into a first power-saving mode when the computing device is locked;
   preventing, by the computing device, the computing device from powering off the display device of the computing device while the computing device is locked and in the first power-saving mode; and
   transitioning from the first power-saving mode into a second power-saving mode, wherein the display device is powered off in the second power-saving mode.

8. The computing device of claim 7, wherein entering into the first power-saving mode comprises decreasing brightness of the display device of the computing device.

9. The computing device of claim 7, wherein entering into the first power-saving mode comprises displaying an image on the display device of the computing device.

10. The computing device of claim 7, wherein the actions further comprise notifying, by the computing device, at least one application running on the computing device that the computing device is locked.

11. The computing device of claim 7, wherein the actions further comprise intercepting, by the computing device, a command for decreasing brightness of the display device of the computing device.

12. The computing device of claim 7, wherein the actions further comprise intercepting, by the computing device, a command for turning off the display device of the computing device.

13. At least one computer-readable storage memory that includes computer executable instructions that, based on execution by a computing device that includes a display device, cause the computing device to perform actions comprising:
   locking, by the computing device, the computing device, wherein when the computing device is locked, the computing device acts on fewer inputs than when the computing device is unlocked;
   altering power-saving functionality that applies while the computing device is locked;
   entering into a first power-saving mode when the computing device is locked;
   preventing, by the computing device, the computing device from powering off the display device of the computing device while the computing device is locked and in the first power-saving mode; and
   transitioning from the first power-saving mode into a second power-saving mode, wherein the display device is powered off in the second power-saving mode.

14. The at least one computer-readable storage memory of claim 13, wherein entering into the first power-saving mode comprises decreasing brightness of the display device of the computing device.

15. The at least one computer-readable storage memory of claim 13, wherein entering into the first power-saving mode comprises displaying an image on the display device of the computing device.

16. The at least one computer-readable storage memory of claim 13, wherein the actions further comprise notifying, by the computing device, at least one application running on the computing device that the computing device is locked.

17. The at least one computer-readable storage memory of claim 13, wherein the actions further comprise intercepting, by the computing device, a command for decreasing brightness of the display device of the computing device or for turning off the display device.

* * * * *